Aug. 26, 1958  H. H. DEIST  2,848,956
VEHICLE SUSPENSION
Filed Dec. 15, 1955  2 Sheets-Sheet 1
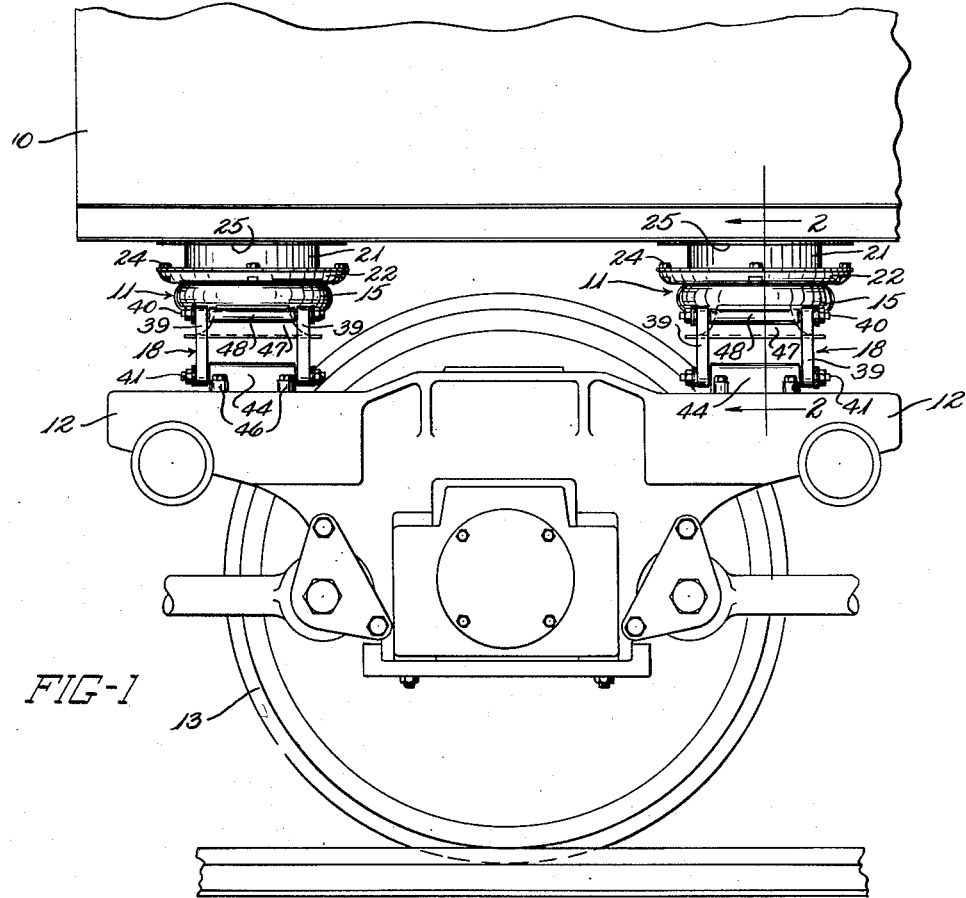
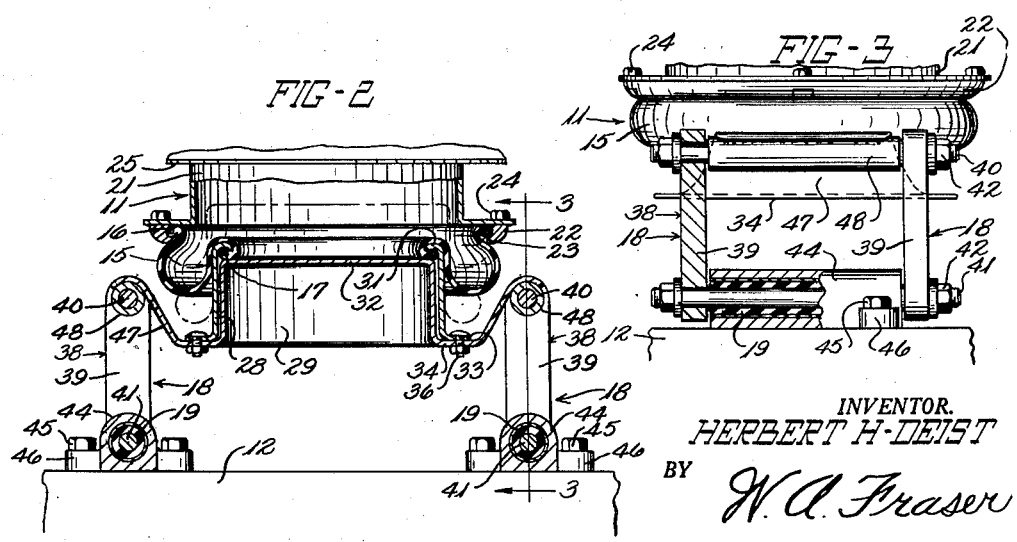
INVENTOR.
HERBERT H. DEIST
BY
W. A. Fraser
ATTY.

Aug. 26, 1958     H. H. DEIST     2,848,956
VEHICLE SUSPENSION

Filed Dec. 15, 1955     2 Sheets-Sheet 2

INVENTOR.
HERBERT H. DEIST
BY
W. A. Fraser
ATTY-

United States Patent Office 2,848,956
Patented Aug. 26, 1958

2,848,956

VEHICLE SUSPENSION

Herbert H. Deist, Akron, Ohio, assignor to The Firestone Tire & Rubber Company, Akron, Ohio, a corporation of Ohio Application December 15, 1955, Serial No. 553,293

4 Claims. (Cl. 105—199)

This invention relates to suspensions for rail cars and more particularly to a suspension having desirable rate characteristics in both the vertical and lateral directions.

The present invention utilizes a single convolution bellows in a rail car suspension which provides a desirable soft ride so far as shocks in the vertical direction are concerned. The features of construction which give the bellows its low rate in the vertical direction also give it a high rate in the lateral direction and provide a high degree of lateral stability. These characteristics enable the bellows to be utilized in conjunction with desirably low rate spring means in the lateral direction. The arrangement provides a rugged suspension having the desired rate characteristics in both the vertical and lateral directions. The suspension occupies a minimum of space, is easy and economical to manufacture, and requires a minimum of maintenance.

It is accordingly a general object of the invention to provide an improved suspension for rail cars having a desirably soft rate in both the vertical direction and lateral direction. A more specific object is to provide a suspension embodying a bellows having a high lateral stability enabling it to be mounted with cushioning means to take up lateral shocks by permitting bodily movement of the bellows. Another object is to provide a vehicle suspension having means with a low rate in the vertical direction and a high rate laterally in conjunction with supplementary means having a low rate in the lateral direction.

These and further objects and advantages will be more fully apparent from the following description of a preferred form of the invention, reference being had to the accompanying drawings in which:

Figure 1 is a side elevation of a suspension, embodying the present invention, associated with one of the wheels of a rail car;

Figure 2 is a sectional view taken in the plane indicated by the lines 2—2 of Figure 1, showing one of the units of the suspension in neutral position, the scale being somewhat greater than that of Figure 1;

Figure 3 is a view, partly in section, taken in the plane indicated by the lines 3—3 of Figure 2.

Figure 4:
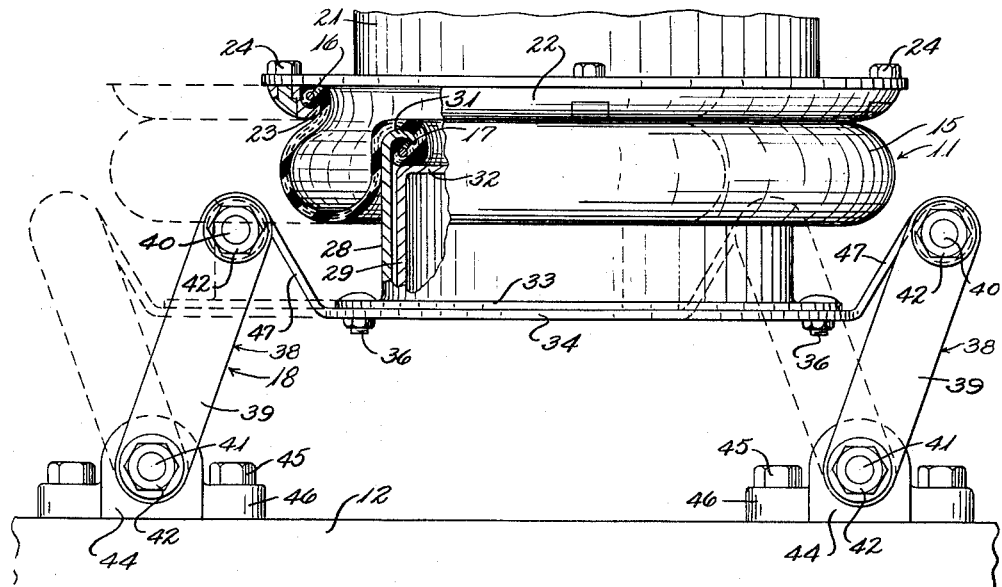
Figure 4 is a view corresponding generally to Figure 2, showing on a larger scale one of the suspension units, and indicating the extremes of lateral movement of the suspension.

The invention is illustrated and described in connection with a light weight rail car 10 having only four wheels, one at each corner of the car. The front end of the car, shown in fragmentary side elevation in Figure 1, is supported by a wheel and axle arrangement which is conventional and will not be described. The car is supported by pairs of identical suspension units 11 mounted on the bolster 12 on each side of the wheels 13. The suspension is identical for each of the wheels, and there are accordingly eight suspension units 11 for a rail car.

Each suspension unit 11 comprises essentially a single convolution bellows 15 secured by its upper bead 16 to the car 10 and by its lower bead 17 to a swinging frame, indicated generally at 18, which is mounted on the bolster 12 in a manner which permits bodily movement of the bellows and car relative to the bolster.

The arrangement is such as to allow free flexing movement of the bellows to cushion vertical shocks while at the same time permitting the bellows (and the rail car body) to swing bodily on the frame 18, with the swinging movement being cushioned by a rubber torsion bushing 19 which also provides a restoring force to return the suspension to the normal lateral position.

The air spring bellows 15 comprises a single convolution body of two plies of rubberized bias-cut fabric. The cords of the plies extend at an angle to each other, and the ply ends are wrapped about and anchored to the beads 16 and 17. The beads are appreciably different in diameter permitting the smaller bead 17 to pass through the upper bead 16 in a telescoping movement to absorb the vertical shocks of service. The deflection of the air spring is indicated by the dotted lines in Figure 2. In this particular example the larger bead 16 has a diameter of about 10 inches while the lower bead 17 has a diameter of 6½ inches. The mean developed length from bead to bead is about 6 in. permitting a total deflection of ±3 inches. Under normal operating conditions the bellows will be inflated with air at an operating pressure of about 70 lbs. per sq. inch and the bellows will have a neutral position as shown in Figure 4.

The air spring is secured to the car frame by means of a tubular supporting member 21 and by the ring 22, which clamp upper bead 16 between them. The edge 23 of the ring is clamped tightly about the bead as best shown in Figure 4 and the ring is secured to the cylindrical supporting member 21 by means of the bolts 24 extending through the parts. The cylindrical supporting member 21 is secured to the frame of the car by any convenient means such as by the radial flange 25 and by bolts (not shown). The cylindrical member 21 preferably has an air-tight connection with the car frame so that it can act as a reservoir containing air under pressure. The cylinder also provides space into which the lower bead 17 moves when the bellows is compressed.

The lower bead 17 is supported by a pair of nested sleeves 28 and 29, the bead being gripped between the crimped edge 31 of the outer sleeve and the closed end 32 of the inner sleeve. The sleeves terminate at their lower ends in radial base flanges 33 and 34 respectively and the sleeves are assembled and clamping pressure is applied to the bead 17 by the bolts 36 which extend through the radial base flanges of the sleeves. With the parts thus assembled the base of the inner sleeve member has a sealing fit with the lower bead rendering the bellows air-tight.

The swinging frame 18 comprises a pair of sub-frames each of which consists of two spaced arms 39 connected at their ends by cross pins 40 and 41, the pins being secured by nuts 42 screwed onto the threaded ends of the pins. The arms are keyed or otherwise secured against rotation to the lower pin 41 and are likewise secured to the upper pin 40. The sub-frames are each supported by a rubber bushing 19 which fits between the lower pin 41 and a cylindrical housing 44 which is secured to the bolster by machine screws 45 extending through lugs 46 integral with the housing 44.

Each of the bushings 19 is molded so that it will undergo considerable radial compression and longitudinal elongation when it is assembled with the pin 41 and the housing 44. When assembled, the bushing will be compressed to a smaller diameter and the bushing will elongate as a result of the compression to take the position of Figure 3. Ordinarily when the bushings are compressed to this extent it is not necessary to vulcanize the bushings to the pin 41 and the outer housing 44 for there will be sufficient frictional contact between the rubber and metal surfaces to develop the desired resistance in torsion. If desired the rubber may be vulcanized to one or both of the metal parts.

The bellows is connected to the swinging frame 18 by bracket portions 47 which are preferably integral with the base flange 34 of the inner sleeve and which extend diagonally upward to the top of the sub-frames 38 where they are welded or otherwise secured to the sleeves 48 which are journaled on the pins 40.

In use, the suspension normally has a position shown in Figure 2. As the wheels and the bolster are subjected to a lateral shock toward the left as viewed in Figure 4, the bolster will move to the left in response to the shock while the bellows and car remain substantially stationary. This position is shown in the full lines of Figure 4. As this relative motion takes place the bushing 19 will be subjected in increasing torsion until eventually the relative motion will snub the position shown in Figure 4. The rubber bushings will exert an increasing restoring force as they approach the extreme positions of Figure 4.

As this relative lateral movement takes place the capacity of the bellows to absorb vertical shocks will remain unimpaired, the bellows being free in all positions to deflect vertically to the position shown by the dotted lines in Figure 2. When the bellows is in the neutral position of Figure 2 it has a frequency of about 40 cycles per minute for a reservoir capacity of about four times the bellows volume, i. e. about 1,000 cubic inches. The bellows has a rate of about 1000 pounds per inch of lateral deflection and as a result the absorption of lateral shocks is assumed entirely by the torsion bushings and is controlled as desired by varying the characteristics of the bushings. If the bellows had a softer lateral rate than the torsion part of the suspension or if the bellows had a high degree of lateral instability the lateral rate could not be controlled but would be shared unpredictably by the bellows and the bushings.

Various modifications will occur to those skilled in the art without departing from the scope of the invention as summarized in the appended claims.

I claim:

1. A rail car suspension comprising a bellows containing air under pressure and having a predetermined rate in vertical deflection and a substantially greater rate in lateral deflection, said bellows being interposed between a portion of the frame of said rail car and a portion of a truck of said rail car and resilient means connecting said bellows to one of said portions, said resilient means having a rate in lateral deflection substantially smaller than the corresponding rate of said bellows.

2. A rail car suspension comprising a bellows containing air under pressure and annular portions of appreciably different diameters with one annular portion connected to the frame of said car and the other annular portion connected to a truck of said car whereby said portions have telescoping movement relative each other to cushion the vertical shocks imparted to said truck, a swinging frame connecting said other portion to said truck and providing for lateral movement between said car frame and said truck and having resilient means resisting the swinging movement of said frame.

3. A rail car suspension comprising bellows containing air under pressure and having beads of appreciably different diameters with one of the beads connected to the frame of said car and the other bead connected by resilient means to a truck of said car, the smaller of said beads having telescoping movement toward and through the other larger bead when said bellows is compressed in response to vertical shocks imparted to said truck, said resilient means comprising a swinging frame positioned between said other bead and said truck and providing for lateral movement between said car frame and said truck and means comprising part of said swinging frame resisting the swinging movement of said frame.

4. A rail car suspension comprising an air spring containing air under pressure and terminating in beads of appreciably different diameter with the larger bead connected to the frame of said car and the smaller bead connected to a truck of said car whereby said beads are capable of telescoping movement relative each other when the air spring is compressed to cushion the vertical shocks imparted to said truck, and a swinging frame connecting said smaller bead to said truck and providing for relative lateral movement between said car frame and said truck, said swinging frame comprising a pair of pivotal sub-frames hinged to said truck by rubber bushings which resist the swinging movement of said frame in torque.

References Cited in the file of this patent

UNITED STATES PATENTS

| | | |
|---|---|---|
| 2,133,279 | Brown | Oct. 18, 1938 |
| 2,537,637 | Candlin et al. | Jan. 9, 1951 |
| 2,636,451 | Watter | Apr. 28, 1953 |
| 2,758,549 | Lich | Aug. 14, 1956 |